(12) United States Patent
Grootaert et al.

(10) Patent No.: US 7,094,839 B2
(45) Date of Patent: Aug. 22, 2006

(54) PROCESS FOR MAKING A FLUOROELASTOMER

(75) Inventors: Werner M. A. Grootaert, Oakdale, MN (US); Klaus Hintzer, Kastl (DE); Bernhard Hirsch, Burgkirchen (DE); Harald Kaspar, Burgkirchen (DE); Robert E. Kolb, Afton, MN (US); Gernot Löhr, Burgkirchen (DE); Werner Schwertfeger, Altoetting (DE)

(73) Assignee: 3M Innovative Properties Company, St. Paul, MN (US)

( * ) Notice: Subject to any disclaimer, the term of this patent is extended or adjusted under 35 U.S.C. 154(b) by 83 days.

(21) Appl. No.: 10/627,149

(22) Filed: Jul. 25, 2003

(65) Prior Publication Data

US 2004/0167290 A1    Aug. 26, 2004

Related U.S. Application Data

(60) Provisional application No. 60/399,245, filed on Jul. 29, 2002.

(51) Int. Cl.
*C08L 27/12*    (2006.01)

(52) U.S. Cl. ............... 525/326.2; 524/502; 524/544; 526/222; 526/242; 526/247; 526/249

(58) Field of Classification Search ............. 525/326.2; 526/242, 247, 249, 222; 524/544, 502
See application file for complete search history.

(56) References Cited

U.S. PATENT DOCUMENTS

| | | | |
|---|---|---|---|
| 2,793,202 A | 5/1957 | Hoyt | |
| 3,345,317 A * | 10/1967 | Hoashi | 524/742 |
| 3,752,787 A | 8/1973 | de Brunner | |
| 4,025,481 A * | 5/1977 | Tournut et al. | 524/793 |
| 4,259,463 A | 3/1981 | Moggi et al. | |
| 4,864,006 A * | 9/1989 | Giannetti et al. | 526/209 |
| 4,972,038 A * | 11/1990 | Logothetis | 526/247 |
| 4,983,697 A * | 1/1991 | Logothetis | 526/206 |
| 5,182,342 A | 1/1993 | Feiring et al. | |
| 5,266,650 A | 11/1993 | Guerra et al. | |
| 5,285,002 A * | 2/1994 | Grootaert | 526/222 |
| 5,565,512 A | 10/1996 | Saito et al. | |
| 5,668,221 A | 9/1997 | Saito et al. | |
| 5,677,389 A | 10/1997 | Logothetis et al. | |
| 5,877,264 A * | 3/1999 | Logothetis et al. | 526/86 |
| 6,429,258 B1 * | 8/2002 | Morgan et al. | 524/805 |
| 6,730,760 B1 * | 5/2004 | Grootaert et al. | 526/247 |
| 6,737,489 B1 * | 5/2004 | Linert et al. | 526/242 |

FOREIGN PATENT DOCUMENTS

| | | |
|---|---|---|
| EP | 0 174 614 | 3/1986 |
| EP | 0 661 304 A1 | 7/1995 |
| EP | 0 769 521 A1 | 4/1997 |
| EP | 0 784 064 A1 | 7/1997 |
| EP | 756610 B1 * | 7/2000 |
| EP | 1 127 896 A1 | 8/2001 |
| EP | 1 160 258 A1 | 12/2001 |
| EP | 1160258 A1 * | 12/2001 |
| EP | 1 172 382 A2 | 1/2002 |
| WO | WO 95/28442 | 10/1995 |
| WO | WO-96-22315 * | 7/1996 |
| WO | WO 96/22315 | 7/1996 |
| WO | WO 00/09603 | 2/2000 |
| WO | WO 01/49752 | 7/2001 |

OTHER PUBLICATIONS

*Zhurnal Obshchei Khimii*, vol. 36(5), pp. 862-871 (1966), CA 65 12206C.
*Journal of Organic Chemistry*, vol. 30, p. 3724-3728, (1965).

* cited by examiner

*Primary Examiner*—David W. Wu
*Assistant Examiner*—Henry S. Hu

(57) ABSTRACT

Aqueous microemulsions obtained from a perfluorinated alkane sulphonic or carboxylic acid or salt thereof, a liquid fluorinated monomer comprising a cure-site and optionally an inert liquid and highly fluorinated hydrocarbon compound. The aqueous microemulsion may be formed by mixing together water, a perfluorinated alkane sulphonic or carboxylic acid or salt thereof, optionally an inert liquid and highly fluorinated hydrocarbon compound and a liquid fluorinated monomer having a cure-site.

18 Claims, No Drawings

PROCESS FOR MAKING A FLUOROELASTOMER

CROSS REFERENCE TO RELATED APPLICATION

This application claims priority to U.S. Provisional Patent Application No. 60/399,245, filed Jul. 29, 2002.

FIELD OF THE INVENTION

The present invention relates to a process for making a fluoroelastomer. In particular, the present invention relates to an aqueous emulsion polymerization process of one or more fluorinated monomers and one or more liquid fluorinated monomers that have a cure-site. Fluoropolymers so prepared are suitable for preparing a fluoroelastomer and are hereinafter also called fluoroelastomer gum.

BACKGROUND OF THE INVENTION

Fluoroelastomers and in particular perfluoroelastomers such as those described in "Modern Fluoropolyrners", edited by John Scheirs, Wiley Science 1997, offer excellent protection against high service temperatures and are resistant to a wide variety of chemical reagents. Fluoroelastomers have been used successfully in a number of applications due to their ability to withstand high temperatures and aggressive chemicals, as well as the ability of the fluoroelastomer gum to be processed using standard elastomer processing equipment. For example, fluoroelastomers have been used in fuel management systems such as automotive fuel hoses, filler neck hoses, injector o-rings, and the like. Fuel management applications require low fuel vapor permeation in combination with good low temperature properties, sealability, and flexural properties. Still further, fluoroelastomers have been used in the semiconductor industry in the chip manufacturing process where the fluoroelastomer may be used as seals in chip fabrication equipment. During chip manufacturing, the fluoroelastomer can be exposed to high temperature and aggressive chemicals. Still further, fluoroelastomers are being used as electrical cable insulators.

Fluoroelastomers are elastomers prepared by curing a fluoroelastomer precursor ("fluoroelastomer gum") made from monomers containing one or more atoms of fluorine, or copolymers of such monomers with other monomers, the fluoromonomer(s) being present in the greatest amount by mass. The fluoroelastomer precursor is a fluoropolymer that is suitable to prepare a fluoroelastomer having desired elasticity properties. Typically, the fluoroelastomer precursor is an amorphous fluoropolymer or a fluoropolymer that hardly shows a melting point. When the fluoropolymer has a perfluorinated backbone, a perfluoroelastomer results but also polymers having a partially fluorinated backbone are used.

A commonly used process for the preparation of fluoropolymers is the aqueous emulsion polymerization which offers an environmental advantage over polymerization in solvents. Generally, the aqueous emulsion polymerization of fluorinated monomers is carried out in the presence of a fluorinated surfactant although techniques have also been developed in which no fluorinated surfactant is added to the polymerization system.

The art is further deplete with various modifications of the aqueous emulsion polymerization process to improve certain aspects thereof or to achieve particular objectives. For example, it is generally recognized in the art to pre-emulsify one or more fluorinated monomers.

It has also been suggested in the art to use micro-emulsions in the aqueous emulsion polymerization of fluorinated monomers. Micro-emulsions are stable isotropic mixtures of oil, water, and surfactant which form spontaneously upon contact of the ingredients. Other components, such as salt or co-surfactant (an alcohol, amine, or other amphiphilic molecule) may also be part of the micro-emulsion formulation. The oil and water reside in distinct domains separated by an interfacial layer rich in surfactant. Because the domains of oil or water are small, micro-emulsions appear visually transparent or translucent. Unlike emulsions and the pre-emulsions disclosed in the above references, micro-emulsions are equilibrium phases.

Fluoropolymer produced through aqueous emulsion polymerization may be cured to obtain the fluoroelastomer if the fluoropolymer contains so-called cure-sites that participate in a cure reaction to form a three dimensional network. A well-known cure reaction used to vulcanize the fluoropolymer involves the use of a peroxide whereby the fluoropolymer contains halogens, e.g. bromine or iodine that are capable of participating in a peroxide cure reaction. These halogens are typically introduced in the fluoropolymer by copolymerizing one or more fluorinated monomers with a fluorinated monomer that contains such a halogen.

Alternatively, the fluoropolymer may have one or more units that derive from a fluorinated monomer that has a nitrile group. Such a nitrile group can be used to cure the fluoropolymer in the presence of ammonia-generating compounds or other curatives or catalysts capable of causing curing of the nitrile groups.

It has now been found that when fluoropolymers having aforementioned cure-sites deriving from corresponding monomers having one or more cure-sites, are prepared through aqueous emulsion polymerization, the resulting fluoroelastomer may show a shiny wet looking surface after curing of the fluoropolymer. Additionally, the amount of organic material that can be extracted from the fluoroelastomer may be undesirably high. The presence of a shiny wet looking surface as well as a large amount of extractable organic material may cause the fluoroelastomer to be unsuitable for certain applications, in particular in demanding applications. This effect is particularly noticeable when low levels of the cure-site monomer are being used, e.g. 1 mole % or less.

Accordingly, there continues to be a need to improve the properties of fluoroelastomers and in particular, to improve properties of fluoroelastomers produced from fluoropolymers that are made through the aqueous emulsion polymerization process.

SUMMARY OF THE INVENTION

It was found that an aqueous microemulsion could be obtained from a perfluorinated alkane sulphonic or carboxylic acid or salt thereof, a liquid fluorinated monomer comprising a cure-site and optionally an inert liquid and highly fluorinated hydrocarbon compound. The aqueous microemulsion may be formed by mixing together water, a perfluorinated alkane sulphonic or carboxylic acid or salt thereof, optionally an inert liquid and highly fluorinated hydrocarbon compound and a liquid fluorinated monomer having a cure-site. The micro-emulsion forms upon gentle stirring of the components and/or optional heating of the mixture. When heating is employed, the mixture will typically be heated to a temperature so as to form a clear transparent mixture and thereafter, the mixture is allowed to cool to ambient temperature.

In another aspect, the invention provides a process of making a fluoropolymer capable of being cured to a fluoroelastomer, the process comprising an aqueous emulsion polymerization of one or more fluorinated monomers and one or more liquid fluorinated monomers having a cure-site, wherein at least part of the liquid fluorinated monomers is provided as an aqueous microemulsion as described above during at least the initial stage of the aqueous emulsion polymerization process.

In yet another aspect, the invention provides a process for making a curable fluoroelastomer composition comprising the steps of providing a fluoropolymer according to the process described above and mixing the fluoropolymer with a cure composition comprising one or more compounds capable of effecting curing of the fluoropolymer through the cure-site components of the fluoropolymer.

In a still further aspect, the invention also provides a method of making a fluoroelastomer wherein the curable fluoroelastomer composition described above is cured.

The invention in another aspect also provides a cured fluoropolymer derivable from curing a fluoropolymer comprising units deriving from a liquid fluorinated monomer having a cure-site, wherein the amount of organic components extractable from the cured fluoropolymer with perfluoro benzene during Soxhlet extraction for 20 h is less than 5% by weight based on the weight of the cured fluoropolymer.

It was found that the use of a micro-emulsion of the liquid fluorinated monomer having a cure site, in at least the initial stage of the aqueous emulsion polymerization process to produce the fluoropolymer, resulted in a substantial improvement of the fluoroelastomer that could be produced from such fluoropolymer upon curing. In particular, it was found that the fluoroelastomer did not show a wet shiny look after the vulcanization and also the amount of organic components extractable from the fluoropolymer was reduced. Also, the fluoroelastomer produced showed good physical and mechanical properties such that the fluoroelastomer may be suitable even in more demanding applications.

DETAILED DESCRIPTION OF THE INVENTION

The microemulsions in connection with the present invention are stable, isotropic mixtures of liquid fluorinated monomer, optionally the inert liquid and highly fluorinated hydrocarbon compound, water, and the fluorinated surfactant. The micro-emulsions typically form spontaneously upon contact or gently stirring of the ingredients and/or optional heating. Generally, when heating is employed, the temperature at which the micro-emulsion forms, i.e. when a clear and transparent mixture is obtained, is in the range of 40° C. to 90° C. Upon cooling, the mixture remains clear and transparent. The mixture of liquid fluorinated monomer and optionally inert liquid and highly fluorinated hydrocarbon form distinct oil domains in the aqueous medium separated by an interfacial layer rich in surfactant. Because the domains of oil or water are so small, micro-emulsions appear visually transparent or translucent. Unlike emulsions, micro-emulsions are equilibrium phases. Although a micro-emulsion forms between only the fluorinated surfactant and the liquid fluorinated monomer having a cure-site, the amount of the liquid fluorinated monomer that can be obtained in the form of a micro-emulsion will be larger by adding the inert liquid and highly fluorinated hydrocarbon compound.

By the term 'liquid' as used in conjunction with the fluorinated monomer or the inert and highly fluorinated hydrocarbon is meant that the respective components are liquid at ambient temperature and pressure conditions, i.e. at about 20° C. and about 1 atm. pressure.

The term 'highly fluorinated' in connection with the present invention is used to indicate compounds in which most and preferably all hydrogen atoms have been replaced with fluorine atoms as well as compounds wherein the majority of hydrogen atoms have been replaced with fluorine atoms and where most or all of the remainder of the hydrogen atoms has been replaced with bromine, chlorine or iodine. Typically, a highly fluorinated compound in connection with this invention will have only few, e.g. 1 or 2 hydrogen atoms replaced by a halogen other than fluorine and/or have only one or two hydrogen atoms remaining. When not all hydrogen atoms are replaced by fluorine or another halogen, i.e. the compound is not perfluorinated, the hydrogen atoms should be in a position on the compound such that substantially no chain transfer thereto occurs, i.e. such that the compound acts as an inert in the polymerization, i.e. the compound does not participate in the free radical polymerization. Compounds in which all hydrogens have been replaced by fluorine and/or other halogen atoms are herein referred to as 'perfluorinated'.

The fluorinated surfactant tat can be used to prepare the micro-emulsion is a perfluorinated alkane sulphonic or carboxylic acid or salt thereof typically having between 4 and 15 l carbon atoms, preferably 8 carbon atoms. Preferably, the fluorinated surfactant corresponds to the formula:

$(Y-R_f-Z)_n\text{-M}$     (I)

wherein Y represents Cl or F; $R_f$ represents a linear or branched perfluorinated alkylene having 3 to 15 carbon atoms, preferably 4 to 10 carbon atoms; Z represents $COO^{31}$ or $SO_3^-$; M represents a cation including monovalent and multivalent cations, and n corresponds to the valence of M. Examples of cations include ammonium, alkali metal cations such as sodium, potassium and lithium and earth alkaline metal cations such as calcium or magnesium.

The inert liquid and highly fluorinated hydrocarbon compound that can be used to prepare the micro-emulsion typically comprises between 3 and 25 carbon atoms, preferably between 5 and 20 carbon atoms and may contain upto 2 heteroatoms selected from oxygen, sulfur or nitrogen. Preferably the highly fluorinated hydrocarbon compound is a perfluorinated hydrocarbon compound. Suitable perfluorinated hydrocarbons include perfluorinated saturated linear, branched and/or cyclic aliphatic compounds such as a perfluorinated linear, branched or cyclic alkane; a perfluorinated aromatic compound such as perfluorinated benzene, or perfluorinated tetradecahydro phenanthene. It can also be a perfluorinated alkyl amine such as a perfluorinated trialkyl amine. It can further be a perfluorinated cyclic aliphatic, such as decalin; and preferably a heterocyclic aliphatic compound containing oxygen or sulfur in the ring, such as perfluoro-2-butyl tetrahydrofuran.

Specific examples of perfluorinated hydrocarbons include perfluoro-2-butyltetrahydrofuran, perfluorodecalin, perfluoromethyldecalin, perfluoromethylcyclohexane, perfluoro (1,3-dimethylcyclohexane), perfluorodimethyldecahydronaphthalene, perfluorofluorene, perfluoro (tetradecahydrophenanthrene), perfluorotetracosane, perfluorokerosenes, octafluoronaphthalene, oligomers of poly(chlorotrifluoroethylene), perfluoro(trialkylamine) such as perfluoro(tripropylamine), perfluoro(tributylamine), or perfluoro(tripentylamine), and octafluorotoluene, hexafluorobenzene, and commercial fluorinated solvents, such as Fluorinert FC-75, FC-72, FC-84, FC-77, FC-40, FC-43, FC-70, FC 5312 or FZ 348 all produced by 3M Company. It will further be clear to one skilled in the art that a mixture of perfluorinated hydrocarbons can be used to prepare the micro-emulsion. A suitable inert liquid and highly fluorinated hydrocarbon compound is $C_3F_7$—O—$CF(CF_3)$—$CF_2$—O—CHF—$CF_3$.

The liquid fluorinated monomer used in the micro-emulsion is a fluorinated monomer that contains a cure-site, i.e. a functional group that can subsequently be used to cure the fluoropolymer produced in the aqueous emulsion polymerization. Typically, the cure site will be a halogen capable of participating in a peroxide cure reaction such as chlorine, bromine or iodine or the cure site can be a nitrile group. In a preferred embodiment, the fluorinated monomer having the cure-site is perfluorinated. Examples of liquid fluorinated monomers having a cure-site include (per)fluorinated vinyl ethers having one or more nitrile groups, (per)fluorinated olefins having one or more nitrile groups, (per)fluorinated olefins having one or more halogen atoms selected from the group consisting of chlorine, bromine and iodine, (per)fluorinated vinyl ethers having one or more halogen atoms selected from the group consisting of chlorine, bromine and iodine. Mixtures of the liquid fluorinated monomer can be used as well.

In one embodiment of the invention, the liquid fluorinated monomer having a cure-site is a nitrile containing monomer that corresponds to one of the following formulas:

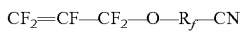

$CF_2=CF-CF_2-O-R_f-CN$

$CF_2=CFO(CF_2)_lCN$

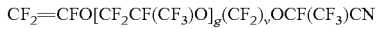

$CF_2=CFO[CF_2CF(CF_3)O]_g(CF_2)_vOCF(CF_3)CN$

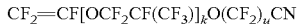

$CF_2=CF[OCF_2CF(CF_3)]_kO(CF_2)_uCN$ wherein, l represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoroether group. Specific examples of nitrile containing liquid fluorinated monomers include perfluoro(8-cyano-5-methyl-3,6-dioxa-1-octene), $CF_2=CFO(CF_2)_5CN$, and $CF_2=CFO(CF_2)_3OCF(CF_3)CN$.

According to another embodiment, the liquid fluorinated monomer having a cure-site corresponds to one of the following formulas:

(a) bromo- or iodo-(per)fluoroalkyl-perfluorovinylethers having the formula:

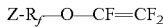

$Z-R_f-O-CF=CF_2$ wherein Z is Br or I, $R_f$ is a (per)fluoroalkylene $C_2-C_{12}$, optionally containing chlorine and/or ether oxygen atoms; for example: $BrCF_2CF_2-O-CF=CF_2$, $BrCF_2CF_2CF_2-O-CF=CF_2$, $CF_3CFBrCF_2-O-CF=CF_2$, and the like;

(b) bromo- or iodo (per)fluoroolefins such as those having the formula:

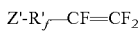

$Z'-R'_f-CF=CF_2$ wherein Z' is Br or I, $R'_f$ is a (per)fluoroalkylene $C_1-C_{12}$, optionally containing chlorine atoms; for instance: bromotrifluoroethylene, 4-bromo-perfluorobutene-1, and the like; or bromofluoroolefins such as 4-bromo-3,3,4,4-tetrafluorobutene-1.

The micro-emulsion may contain additional ingredients although not necessary. For example, a chain transfer agent can be added thereto and/or other liquid (fluorinated) monomers may be added as well. For example, a liquid fluorinated vinyl ether that does not contain a cure-site may be added to the micro-emulsion. It will be understood however that any ingredient added to the micro-emulsion should be selected so as to not destroy the micro-emulsion.

The amounts of the components making up the initial micro-emulsion are typically selected as follows (all percentage expressed as % by weight based on the total weight of the micro-emulsion): between 5 and 50% of perfluoroalkane carboxylic or sulphonic acid or salt thereof, between 0 and 15% of inert liquid and highly fluorinated, preferably perfluorinated, hydrocarbon compound and between 5 and 30% of liquid fluorinated monomer having a cure-site. Preferred ranges are between 10 and 30% of perfluoroalkane carboxylic or sulphonic acid or salt thereof, between 0.2 and 10% of inert liquid and highly fluorinated, preferably perfluorinated, hydrocarbon compound and between 8 and 20% of liquid fluorinated monomer having a cure-site. The initial micro-emulsion may be further diluted by factor of 1–1000 prior to use, e.g. by adding the micro-emulsion to the polymerization medium prior to the start of the polymerization. Such dilution does not appear to affect the merits of the invention.

The above described micro-emulsion is used in an aqueous emulsion polymerization to produce a fluoropolymer capable of being cured to a fluoroelastomer. According to the process to produce the fluoropolymer, one or more fluorinated monomers and one or more liquid fluorinated monomers having a cure-site are copolymerized in the aqueous emulsion polymerization wherein at least part of the liquid fluorinated monomer is provided as an aqueous micro-emulsion as described above. The aqueous micro-emulsion of the liquid fluorinated monomer is provided at least during the initial stages of the polymerization process. Thus, the aqueous micro-emulsion will typically be charged to the polymerization medium prior to commencing the polymerization or immediately or shortly thereafter. By the initial stage of the polymerization as used herein is meant the first 5 to 10 minutes following initiation of the polymerization.

In accordance with one embodiment of the invention, all of the liquid fluorinated monomer having a cure-site may be added in the form of a micro-emulsion prepared as above described. However, this may not be necessary and thus in accordance with an alternative embodiment, part of the liquid fluorinated monomer may be added in a form other than a micro-emulsion. Generally, at least 2% by weight of the total weight of liquid fluorinated monomer having a cure-site will be added under the form of a micro-emulsion, preferably at least 10% by weight based on the total weight of liquid fluorinated monomer having a cure-site. When liquid fluorinated monomer having a cure-site is added in a form other than a micro-emulsion, it will preferably be pre-emulsified with fluorinated surfactant and thus be added as an aqueous emulsion. Such an emulsion can be prepared by emulsifying the liquid fluorinated monomer in water with a fluorinated surfactant, preferably the same as used for the micro-emulsion, through the use of emulsifying equipment such as an Ultra-turrax device and/or a micro fluidizer (as described in WO 1/49752). Typically, the emulsion so formed will be milky or opaque in appearance and will usually have an average particle size of 200 nm to 1 μm. The total amount of liquid fluorinated monomer having a cure-site used in the aqueous polymerization is typically selected so as to obtain the desired amount of cure-site components in the resulting fluoropolymer. Generally, the amount of repeating units in the fluoropolymer that derive from liquid fluorinated monomer having a cure-site is between 0.1 mol % and 5 mol % based on the total amount of repeating units deriving from monomers used to form the fluoropolymer. Preferably the amount is between 0.5 mol % and 3 mol %. The invention is most effective when the amount of the repeating units deriving from the liquid fluorinated monomer having a cure-site is low, e.g. not more than 1.5 mole%, in particular when the amount is not more than 1 mole %.

The one or more fluorinated monomers used in the copolymerization with the liquid fluorinated monomer having a cure-site typically comprise at least one fluorinated olefin such as tetrafluoroethylene (TFE), chlorotrifluoroethylene (CTFE), hexafluoropropylene (HFP) and vinylidene fluoride (VDF). Further fluorinated monomers which are typically used in combination with one or more of the aforementioned fluorinated olefins include (per)fluorinated vinyl ethers and (per)fluorinated allyl ethers. Also, the polymerization may involve non-fluorinated monomers such as ethylene (E) and propylene (P). In a particularly preferred embodiment, the fluoropolymer produced will have a per-fluorinated backbone. Such a perfluorinated polymer can be produced by using only perfluorinated monomers in the polymerization. The present invention is nevertheless also useful in producing polymers that have a partially fluorinated backbone but generally, the fluorine content in the backbone of the fluoropolymer will be at least 35% by weight, more preferably at least 50% by weight and most preferably at least 65% by weight.

Examples of perfluorinated vinyl ether monomers include those corresponding to the formula:

$CF_2\!\!=\!\!CF\!\!-\!\!O\!\!-\!\!R_f$ wherein $R_f$ represents a perfluorinated aliphatic group that may contain one or more oxygen atoms. Preferably, the perfluorovinyl ethers correspond to the general formula:

$CF_2\!\!=\!\!CFO(R_fO)_n(R'_fO)_mR''_f$ wherein $R_f$ and $R'_f$ are different linear or branched perfluoroalkylene groups of 2–6 carbon atoms, m and n are independently 0–10, and $R''_f$ is a perfluoroalkyl group of 1–6 carbon atoms. Examples of perfluorovinyl ethers according to the above formulas include perfluoro-2-propoxypropylvinyl ether (PPVE-2), perfluoro-3-methoxy-n-propylvinyl ether, perfluoro-2-methoxy-ethylvinyl ether, perfluoromethylvinyl ether (PMVE), perfluoro-n-propylvinyl ether (PPVE-1) and $CF_3\!\!-\!\!(CF_2)_2\!\!-\!\!O\!\!-\!\!CF(CF_3)\!\!-\!\!CF_2\!\!-\!\!O\!\!-\!\!CF(CF_3)\!\!-\!\!CF_2\!\!-\!\!O\!\!-\!\!CF\!\!=\!\!CF_2$.

Particular examples of fluoropolymers that can be produced with the process of this invention include those comprising combination of repeating units deriving from a combination of monomers comprising vinylidene fluoride (VDF), hexafluoropropylene (HFP) and CSM; TFE, VDF and CSM; TFE, P and CSM; TFE, CSM and a perfluorovinyl ether (e.g. PMVE, PPVE-1, PPVE-2 or a combination of PPVE-1 and PPVE-2); VDF, CSM and perfluorovinyl ether (e.g. PMVE, PPVE-1, PPVE-2 or a combination of PPVE-1 and PPVE-2); TFE, E or P, CSM and perfluorovinyl ether (e.g. PMVE, PPVE-1, PPVE-2 or a combination of PPVE-1 and PPVE-2); TFE, CSM, HFP and perfluorovinyl ether (e.g. PMVE, PPVE-1, PPVE-2 or a combination of PPVE-1 and PPVE-2); TFE, VDF, HFP, CSM and optionally CTFE; TFE, VDF, CSM and perfluorovinyl ether (e.g. PMVE, PPVE-1, PPVE-2 or a combination of PPVE-1 and PPVE-2); and TFE, E or P, HFP, CSM and perfluorovinyl ether (e.g. PMVE, PPVE-1, PPVE-2 or a combination of PPVE-1 and PPVE-2). In the above, CSM is used as an abbreviation for the liquid fluorinated cure-site monomer and is preferably a nitrile containing fluorinated vinyl ether.

Apart from the use of the micro-emulsion, the aqueous emulsion polymerization process is generally conducted in the commonly known manner. Preferred polymerization temperatures are 10 to 100° C., preferably 30° C. to 80° C. and a pressure of 4 to 30 bar, in particular 6 to 15 bar.

The polymerization is generally initiated through the use of free radical generating initiators. As initiators, one can use any of the known initiators commonly employed in the polymerization of fluorinated monomers. For example peroxides can be used as free radical initiators. Specific examples of peroxide initiators include, hydrogen peroxide, sodium or barium peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate, a combination of peroxodisulphate and hydrazine or azodicarboxamide (including salts thereof, preferably alkali or ammonium salts). Further initiators that can be used are ammonium-alkali- or earth alkali salts of permanganic or manganic acid or manganic acids.

A particularly preferred initiation system involves the use of a free radical initiator, e.g. permanganic acid or a salt thereof such as potassium permanganate or persulfates, and a chloride salt such as a chloride salt of the formula:

$M\,Cl_n$ wherein M represents a mono- or multi-valent cation and n corresponds to the valence of the cation. Suitable cations M include organic and inorganic cations. Particularly useful cations are ammonium and metal cations including monovalent cations such as sodium and potassium as well as divalent cations such as calcium and magnesium. Examples of ammonium chloride salts include tetraalkyl ammonium chlorides such as tetrabutyl ammonium chloride. The advantage of using such a polymerization system is that the number of ionic end groups in the fluoropolymer produced can be conveniently be reduced. Generally, by increasing the amount of chloride salt, the number of ionic end groups reduces. It is believed that the use of chloride salt in the initiation system results in the formation of $CF_2Cl$ end groups. Generally, the amount of chloride salt is selected such that the molar ratio of chloride ions to initiator (e.g. permanganate) is between 1:0.1 and 0.1:10, preferably between 1:0.5 and 0.1:5.

An alternative method to lower the amount of ionic end groups in the fluoropolymer involves the use of a combination of a fluoroaliphatic sulfinate and an oxidizing agent capable of oxidizing the sulfinate to a sulfonyl radical as disclosed in U.S. Pat. No. 5,285,002. Suitable oxidizing agents include for example a persulfate such as ammonium persulfate.

Thus, according to a particular embodiment, when the fluoropolymer is a perfluoropolymer, the initiator system and amount thereof are selected such that the amount of ionic end group in the resulting perfluoropolymer is such that the absorbance ratio determined by calculating the integrated peak intensity within the range of 1840 $cm^{-1}$–1620 $cm^{-1}$ to the integrated peak intensity in the range 2740 $cm^{-1}$–2220 $cm^{-1}$ in a Fourier transform infrared spectrum of the perfluoropolymer, is less than 0.1.

The amount of initiator employed is typically between 0.01 and 2% by weight, preferably between 0.03 and 1% by weight based on the total weight of the polymerization mixture. The full amount of initiator may be added at the start of the polymerization or the initiator can be added to the polymerization in a continuous way during the polymerization until a conversion of 70 to 80% is achieved. One can also add part of the initiator at the start and the remainder in one or separate additional portions during the polymerization. Accelerators such as for example water soluble salts of iron, copper and silver may preferably be added, in particular when redox systems are used as initiators.

The aqueous emulsion polymerization system may further comprise other materials, such as buffers and, if desired, complex-formers or chain-transfer agents. Depending on the amount of fluorinated surfactant used to prepare the micro-emulsion and the amount of micro-emulsion added to the polymerization system, it may or may not be necessary to add further fluorinated surfactant to the aqueous polymerization medium. When additional fluorinated surfactant is needed, e.g. in diluting the micro-emulsion, it will generally be preferred to use the same fluorinated surfactant as used in the preparation of the micro-emulsion or alternatively, a fluorinated surfactant of a like nature can be used. Typically, the total amount of fluorinated surfactant used in the aqueous emulsion polymerization is between 0.1% by weight and 5% by weight based on the weight of fluoropolymer to be produced.

The fluoropolymer produced with the method of this invention is suitable for producing a fluoroelastomer therewith. To obtain a fluoroelastomer, a curable fluoroelastomer composition comprising the fluoropolymer and a cure composition is cured. The curable fluoroelastomer composition may be cured by any of the methods known to those skilled in the art. The cure composition typically includes one or more components that cause the fluoropolymer chains to link with each other thereby forming a three dimensional network. Such components may include catalysts, curing agents and/or coagents.

When the fluoropolymer includes cure-sites comprising halogens capable of participating in a peroxide cure reaction, the cure composition will typically include an organic peroxide. Suitable organic peroxides are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl] carbonate. Generally, about 1–3 parts of peroxide per 100 parts of fluoropolymer is used.

When the fluoropolymer includes a nitrile containing cure site component, a catalyst comprising one or more ammonia-generating compounds may be used to cause curing. "Ammonia-generating compounds" include compounds that are solid or liquid at ambient conditions but that generate ammonia under conditions of cure. Such compounds include, for example, hexamethylene tetramine (urotropin), dicyan diamid, and metal-containing compounds of the formula:

where $A^{W+}$ is a metal cation such as $Cu^{2+}$, $Co^{2+}$, $Co^{3+}$, $Cu^{+}$, and $Ni^{2+}$; w is equal to the valance of the metal cation; $Y^{W-}$ is a counterion, typically a halide, sulfate, nitrate, acetate or the like; and v is an integer from 1 to about 7.

Also useful as ammonia-generating compounds are substituted and unsubstitued triazine derivatives such as those of the formula:

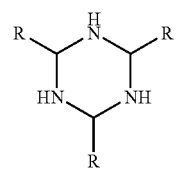

wherein R is a hydrogen or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer. Ammonia-generating compounds when used to effect curing of a fluoropolymer having nitrile groups, are typically used in an amount of 0.1 to 10 parts per hundred parts by weight (phr) of the fluoropolymer to cure the fluoropolymer to an elastomer having desired physical and mechanical properties.

A further component that can be used to cure nitrile containing fluoropolymers includes compounds of the following formula:

(II)

wherein the group $HA^1$ is an inorganic or organic acid, e.g., HCl, $HNO_3$, $C_7F_{15}COOH$, and wherein $R_1$, $R_2$, and $R_3$ are each, independently, the same or different alkyl groups having from 1 to about 20 carbon atoms, which may be cyclic or heterocyclic, and one R group may instead be a bond to another R group such that the nitrogen is bonded to or part of an alkenyl, cycloalkenyl, or aromatic group. The substituents may also be olefinic, e.g., mono, di, and trialkyl amine salts, and pyridine salts. Examples of compounds of above formula (II) include compounds of the formula:

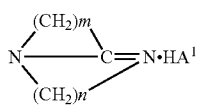

(IIA)

wherein m and n are, independently, 2 to 20.

Preferred examples of Formula (IIA) compounds include those wherein m=3 and n=5 and wherein m=4 and n=2. This includes, for example, salts of 1,8-diazabicyclo[5,4,0]undec-7-ene(DBU) and 1,5-diazabicyclo[4,3,0]non-5-ene (DBN). These salts may be prepared, for example, by reacting DBU or DBN with an organic or inorganic acid in an organic solvent such as methanol or acetone, or they may be prepared in situ. The acid can be organic or inorganic, for example $C_7F_{15}COOH$, or any hydrocarbon or fluorine containing carbonic acid, sulfonic acid, etc., and inorganic acids such as HCl, $HNO_3$, etc., that form stable salts. Another preferred compound of Formula IIA is pyridine hydrochloride. Compounds of formula (II) or (IIA) may be used in an amount of 0.05 to 10 phr of fluoropolymer, preferably in an amount of 0.5 to 5 phr of fluoropolymer to cause curing of a nitrile containing fluoropolymer.

Compounds of the aforementioned formula (II) or (IIA) are advantageously combined with imidates, including those having the formula $R^aC(OR^b)=NH$, and salts thereof, where $R^a$ and $R^b$ independently represent, a substituted or unsubstituted $C_1$–$C_{20}$ (preferably $C_1$–$C_{10}$, more preferably $C_1$–$C_7$) alkyl, aryl, aralkyl, alkenyl, cycloalkyl, or cycloalkenyl group. "Substituted" means substituted by substituents that do not interfere with the desired product. Examples of suitable substituents include halogen (e.g., chlorine, fluorine, bromine, iodine), cyano, alkoxy, and carboxy groups. In addition, one or more of the carbon atoms may be substituted by a heteroatom such as oxygen or nitrogen. Imidates may be prepared as described in Zh. Obs. Khimii, vol. 36(5), pp. 862–71 (1966), CA 65 12206c and J. Org. Chem., Vol. 30, page 3724 (1965), which are herein incorporated by reference. Examples of useful groups for $R^a$ and $R^b$ include fluoroalkyl, perfluoroalkyl, and perfluoro polyether groups (e.g., as described in U.S. Pat. No. 5,266,650). In addition, more than one imidate group may be included in a compound. Examples of useful imidates, include for example, $CF_3O(CF_2)_mOCF(CF_3)C(NH)OCH_3$ where m is an integer from 1 to 4, and $C_3F_7(O(CF_3)CF_2)_nOCF(CF_3)C(NH)OCH_3$ where n=0 to 3.

Still further curatives that can be used to cure a nitrile containing fluoropolymer include compounds of the following formula:

$$\{R^dA\}^{(-)}\{QR^c_k\}^{(+)} \quad (III)$$

wherein $R^d$ represents an alkyl or alkenyl group having from 1 to 20 carbon atoms, cycloalkyl or cycloalkenyl having 3 to 20 carbon atoms or aryl or alkaryl having from 6 to 20 carbon atoms and wherein $R^d$ may be partially or fully fluorinated and/or wherein $R^d$ may be substituted such as where one or more hydrogen atoms in the group is replaced with Cl, Br or I. Additionally, $R^d$ may include one or more heteroatoms such as O, P, S or N. Examples of perfluorinated groups $R^d$ include perfluoroalkyl groups of the formula $C_nF_{2n+1}$ where n is 1 to 20, perfluorocycloalkyl groups of the formula $C_mF_{2m-1}$ where m is 3 to 20, $C_6$–$C_{20}$ perfluoraryl groups and $C_2$–$C_{20}$ perfluoroalkenyl groups.

A is an acid anion or an acid derivative anion, e.g., A can be COO, $SO_3$, $SO_2$, S, $SO_2NH$, $PO_3$, $CH_2OPO_3$, $(CH_2O)_2PO_2$, $C_6H_4O$, $OSO_3$, O (in the cases where $R^d$ is aryl or alkylaryl),

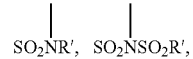

and

preferably COO, O, $C_6H_4O$, $SO_3$, $OSO_3$, or

most preferably COO, O, $SO_3$, and $OSO_3$; R' can have one of the meanings of $R^c$ set forth below or can be a perfluorinated group as listed in respect of $R^d$ above and R can have one of the meanings set forth below for $R^c$ and a particular selection for R' may be the same or different from $R^d$, and one or more A groups may be attached to $R^d$.

Q is phosphorous (P), sulfur (S), nitrogen (N), arsenic (As), or antimony (Sb), and k is the valence of Q.

Each $R^c$ is, independently, hydrogen or a substituted or unsubstituted $C_1$–$C_{20}$ alkyl, aryl, aralkyl, or alkenyl group. As used herein, "substituted" means substituted by substituents that do not interfere with the desired product. Examples of suitable substituents include halogen (e.g., Cl, F, Br, I), cyano, $OR^e$, and $COOR^e$ groups wherein $R^e$ is a group selected from hydrogen or the alkali or alkaline earth metals, of which H, K, Na, and $NH_4$, are preferred, $C_1$ to $C_{20}$ alkyl, aryl, aralkyl, alkenyl, and fluorinated or perfluorinated analogues thereof. In addition, any pair of said $R^e$ groups may be connected to each other and the Q atom to form a heterocyclic ring.

Examples of anions $R^dA$ in above formula (III) include $C_4F_9SO_3$, $C_3F_7COO$, $C_7F_{15}COO$, $C_8F_{17}SO_3$, $C_4F_9SO_2NSO_2C_4F_9$, $CF_3CF(CF_3)CH_2O$ and $C_nF_{2n+1}CH_2O$ wherein n is 2 to 100 (preferably 2 to 20, and more preferably 2 to 10). Further anions include the anions of the general formula:

$$R_x\text{-Ph}_y\text{-}(-(CH_2)_n\text{-D})_m$$

wherein Ph is phenyl, each $R_x$ is the same or different alkenyl or an alkyl of 1 to 10 carbon atoms, which may be substituted or unsubstituted, x is 0 to 5, y is 0 or 1, n is 0 to 10, m is 1 to 5, and D is selected from COO, $OSO_3$, $SO_3$, and O (when y is 1), provided that the sum of x and m is 6 or less. Useful anion examples include Ph-COO, Ph-O, $CH_3$—$(CH_2)_p$—O—$SO_3$ when p is 1 to 10, and carboxylates of the general formula R—COO wherein R is alkenyl, an alkyl of 1 to 10 carbon atoms, e.g., acetate or propionate, or an aryl of 6 to 20 carbon atoms. Multi-carboxylates, multi-sulfates and multi-sulfonates are also useful, e.g., $^{(-)}OOC$—$(CH_2)_p$—$COO^{(-)}$ or $^{(-)}OOC$—$(CF_2)_p$—$COO^{(-)}$ wherein p is 0 to 10, and Ph-$((CH_2)_p$—$COO^{(-)})_q$ wherein p and q are independently 1 to 4. A preferred species of bifunctional carboxylic acid is oxalic acid. In addition, blends of two or more compounds as described above can be used for $R^dA$ in formula (III).

Representative aromatic polyoxy compounds include di-, tri-, and tetraoxybenzenes, naphthalenes, and anthracenes, and bisphenols of the formula:

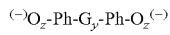

$$^{(-)}O_z\text{-Ph-}G_y\text{-Ph-}O_z^{(-)}$$

wherein G is a bond or a difunctional aliphatic, cycloaliphatic, or aromatic radical of 1 to 13 carbon atoms, or a thio, oxy, carbonyl, sulfinyl, or sulfonyl radical, G and/or Ph are optionally substituted with at least one chlorine or fluorine atom, y is 0 or 1, z is 1 or 2, and any aromatic ring of the polyoxy compound is optionally substituted with at least one atom of chlorine, fluorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. In the above bisphenol formula that the oxygen groups can be attached in any position (other than number one) in either ring. Blends of two or more such compounds can also be used. A preferred class of materials includes the bisphenols, such as those having the general formula: $^{(-)}$O-Ph-C(CX$_3$)$_2$-Ph-O$^{(-)}$ wherein X is H, Cl, or F (e.g., bisphenol AF). When multifunctional acids are used, the mono-, bis-, and multi-complexes can be used.

As is known in the art, an organo-onium is the conjugate acid of a Lewis base (e.g., phosphine, amine, and sulfide) and can be formed by reacting said Lewis base with a suitable alkylating agent (e.g., an alkyl halide or acyl halide) resulting in an expansion of the valence of the electron donating atom of the Lewis base and a positive charge on the organo-onium compound. The preferred organo-onium compounds for the compounds of formula (III) contain at least one heteroatom, i.e., a non-carbon atom such as P, S, N, bonded to organic moieties.

One class of quaternary organo-onium compounds particularly useful broadly comprises relatively positive and relatively negative ions wherein a phosphorus, sulfur, or nitrogen generally comprises the central atom of the positive ion, and the negative ion is an alkyl or cycloalkyl acid anion that may be partially fluorinated, i.e., at least one hydrogen atom is replaced with fluorine, provided that at least one non-fluorine atom remains.

Examples of suitable precursor compounds when Q is phosphorous include tetramethylphosphoniums, tributylallylphosphoniums, tributylbenzylphosphoniums, dibutyldiphenylphosphoniums, tetrabutylphosphoniums, tributyl (2-methoxy) propylphosphoniums, triphenylbenzylphosphoniums, and tetraphenylphosphoniums. These phosphoniums can be hydroxides, chlorides, bromides, alkoxides, phenoxides, etc. The tetraalkyl phosphonium hydroxides and tetraalkyl phosphonium alkoxides are preferred.

Another class of phosphonium compounds include those selected from the group consisting of amino-phosphonium, phosphorane (e.g., triarylphosphorane), and phosphorous containing iminium compounds. Amino-phosphonium compounds that can be used include those described in the art, for example, in U.S. Pat. No. 4,259,463 (Moggi et al.).

The class of phosphonium compounds useful in the invention include phosphorane compounds such as triarylphosphorane compounds; some of the latter compounds are known and are described in the art, see for example, U.S. Pat. No. 3,752,787 (de Brunner), which descriptions are herein incorporated by reference.

When Q is nitrogen, the preferred positive ion has the general formula is $NR^c_4$ or $HNR^c_3$, wherein $R^c$ is as described above. Representative quaternary organo-oniums useful as precursor compounds include phenyltriniethylammoniums, tetrapentylammoniums, tetrapropylammoniums, tetrahexylammoniums, tetraheptylammoniums, tetramethylammoniums, tetrabutylammoniums, tributylbenzyl ammoniums, tributylallylammoniums, tetrabenzylammoniums, tetraphenylammoniums, diphenyl diethylamino ammoniums, triphenylbenzylammoniums, 8-benzyl-1,8-diazobicyclo[5,4,0]-7-undeceniums, benzyltris(dimethylamino) phosphoniums, and bis(benzyldiphenyl phosphine)iminiums. These ammoniums can be hydroxides, chlorides, bromides, alkoxides, phenoxides, etc. Of these positive ions, tetrabutylammonium and tetraphenylammonium are preferred.

When Q is As or Sb, the preferred positive ions include tetraphenylarsonium chloride and tetraphenylstibonium chloride. Overall, the tetraalkylphosphonium compounds are more preferred for the positive ion of the component represented by formula (III). Mixtures of organo-onium compounds are also useful.

The precursors described above are generally commercially available (e.g., from Aldrich Chemicals, Milwaukee, Wis.) or may be prepared by procedures described in the art.

The acids or salts of hydrocarbons useful in preparing the components of formula (III) typically have the general formula $R^d COOM$, $R^d SO_3M$, $R^d OSO_3M$, or $R^d OM$. In these formulas, $R^d$ is as described above with formula (III), and M is hydrogen, or an alkali or alkaline earth metal. Representative materials are the carboxylates, sulfates, sulfonates, and phenolates described above. In addition, blends of two or more compounds of formula (III) as described above, which includes blends of two or more $R^dA$ groups and/or two or more $QR^c_k$ groups, can be used.

A composition including the compounds of formula (III) can be prepared by any suitable method. For example, the two components of the active complex of formula (III), can be incorporated separately as an acid or a salt, e.g., $R^dAX$ wherein X is selected from hydrogen or the alkali or alkaline earth metals, of which H, K, Na, and NH$_4$, are preferred, and $QR^c_kZ$, wherein Z is selected from an anion, which may be organic or inorganic, preferably Cl, Br, OH, OR$^3$, or SO$_4$. The two components can be added to the fluoroelastomer gum separately or as a mixture. In this method, the active complex is formed in situ during processing, heating, and curing. To avoid contamination and the inclusion of metal salts, which is especially important for clean applications (e.g., semiconductors), the complexes should be prepared before incorporation into the curable fluoroelastomer composition, and the resulting salts, XZ, should be filtered or washed out before the active complex is incorporated into the curable fluoroetastomer composition. Other suitable methods, which are known in the art, also may be used to prepare the compounds of formula (III). For example, the two components of the catalyst composition of formula (III) can be dissolved into a suitable solvent (e.g., an alcohol) before precipitating and filtering out the resulting salt, XZ. Salt formation can be avoided by reacting the onium component as the onium-hydroxide or onium-alkoxide with the acid component of the catalyst composition (e.g., reacting Bu$_4$NOH with RCOOH). The active complexes can be incorporated into the curable fluorelastomer composition when dissolved in a solvent or as a dried compound. An excess of the $QR^c_k$ material (e.g., tetraalkyl phosphonium chloride) or the free acid (e.g., $R^dAH$) does not detrimentally affect the properties of the polymer.

The compounds of formula (III) may be used in an amount of 0.1 to 10 phr of fluoropolymer, preferably 0.5 to 5 phr to cause curing of the fluoropolymer to a fluoroelastomer having desirable physical and mechanical properties.

Compounds of formula (III) may be advantageously used in combination with an optional alcohol having the general formula $R^2$—OH, wherein $R^2$ is alkyl group having from 1 to 20 carbon atoms, more preferably 6 to 12 carbon atoms. $R^2$ can be partially fluorinated, e.g., $R_f$—$CH_2$—OH or $R_f$—$CH_2CH_2$—OH wherein $R_f$ is as perfluorinated hydrocarbon group such as a perfluorinated alkyl group. While the addition of alcohol is not required, it may be helpful to modify the viscosity and cure characteristics of the curable fluoroelastomer composition. The alcohol should typically be selected to be compatible in the overall composition. The alcohol should also remain in a mixture of fluoropolymer with the compounds of formula (III) during milling operations and then evaporate during subsequent processing at higher temperatures, during post-cure operations. Examples of presently preferred alcohols include octanol and decanoyl. An effective amount of alcohol is used in the curative system. This amount is determined by several factors including the desired ratio of alcohol to compounds of formula (III), the particular alcohol chosen, and the milling temperature. For example, a higher desired ratio of a lower-boiling alcohol and a higher milling temperature will lead to including greater amounts in the milling process. The particular level for a selected composition is normally a matter of routine experimentation. Generally, this amount is in the range of 0.01 to 10 (more preferably 0.5 to 5) parts by weight alcohol per hundred parts by weight fluoropolymer.

To cure the nitile containing fluoropolymers still further compounds that can be used, include amino phenols (U.S. Pat. No. 5,677,389), ammonia salts (U.S. Pat. No. 5,565,512), amidoxines (U.S. Pat. No. 5,668,221) and other ammonia generating compounds (PCT 00/09603) or imidates.

The fluoropolymers including a nitrile containing cure site component can also be cured using one or more peroxide curatives. Suitable peroxide curatives for this purpose include those listed above. It will further be understood by one skilled in the art that the curable fluoroelastomer may include a mixture of cure site components, such as a mixture of nitrile containing cure sites and cure sites including a halogen capable of participating in a peroxide cure reaction. In the latter case, a mixture of one or more compounds suitable for causing curing the nitrile component and peroxides will generally be employed.

Another component which is usually included in a cure composition based on an organic peroxide and/or nitrile containing cure site component, is a coagent composed of a polyunsaturated compound, which is capable of cooperating with the peroxide to provide a useful cure. These coagents can be added in an amount equal to 0.1 and 10 parts per hundred parts fluoropolymer, preferably between 2–5 parts per hundred parts fluoropolymer. Examples of useful coagents include triallyl cyanurate; triallyl isocyanurate; triallyl trimellitate; tri(methylallyl) isocyanurate; tris(diallylamine)-s-triazine; triallyl phosphite; N,N-dilallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; N,N'-m-phenylenebismaleimide; diallyl-phthalate and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

The curable fluoroelastomer composition may contain further additives, such as carbon black, stabilizers, plasticizers, lubricants, fillers, and processing aids typically utilized in fluoropolymer compounding can be incorporated into the compositions of the present invention, provided they have adequate stability for the intended service conditions. Additionally organic fillers such as fluoropolymers particles may be added. For example, a perfluoroalkoxy copolymer deriving from copolymerizing TFE and a perfluoro vinyl ether such as PPVE (PFA) may be added or fluorinated ethylene/propylene copolymer (FEP) deriving a copolymerization of TFE and HFP can be added.

The curable fluoroelastomer compositions may be prepared by mixing a fluoropolyrner, a cure composition and other additives in conventional rubber processing equipment. Such equipment includes rubber mills, internal mixers, such as Banbury mixers, and mixing extruders.

The invention is further illustrated with reference to the following examples, without however the intention to limit the invention thereto. All parts are by weight unless indicated otherwise.

EXAMPLES

The indicated results were obtained using the following test methods, unless otherwise noted.

Cure rheology: Tests were run on uncured, compounded samples using a Monsanto Moving Die Rheometer (MDR) Model 2000 in accordance with ASTM D 5289-93a at 177° C., no pre-heat, 30 minute elapsed time, and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ("$t_s2$"), the time for the torque to reach a value equal to $M_L+0.5(M_H-M_L)$ ("t'50"), and the time for the torque to reach $M_L+0.9(M_H-M_L)$ ("t'90").

Press-Cure: Sample sheets measuring 150×150×2.0 mm were prepared for physical property determination by pressing at about 6.9 Mega Pascal (MPa) for 30 minutes at 177° C., unless otherwise noted.

Post-Cure: Press-cured sample sheets were exposed to heat under nitrogen using the following six stages of conditions: 25 to 200° C. over 6 hours; 200° C. for 16 hours; 200 to 250° C. over 2 hours; 250° C. for 8 hours; 250 to 300° C. over 2 hours; and 300° C. for 16 hours. The samples were returned to ambient temperature before testing.

Preparation of Bis-(tetrabutyl phosphonium)-perfluoroadipate A two-liter (L) round bottom flask was equipped with magnetic stirring, a temperature probe, and connection to a nitrogen bubbler. The flask was charged with 188 g (0.65 mole) perfluoroadipic acid (made from perfluoroadipoyl fluoride available from 3M Company) and 488 g of distilled water. While stirring, 898 g (1.3 mole) of a 40 weight percent aqueous solution of tetrabutyl ammonium hydroxide (available from Aldrich) was added over one hour. A slight exothermic reaction was observed. The mixture was stirred for an additional hour at room temperature. The flask was heated to 65° C. under a reduced pressure of 15 torr (2 KPa) to remove water to give 523 g (0.65 mole) of $(C_4H_9)_4POCO(CF_2)_4COOP(C_4H_9)_4$ in quantitative yield. Bis-(tetrabutyl phosphonium)-perfluoroadipate has a melting point of 121–123° C. and FNMR confirmed the structure and 2 to 1 molar ratio.

Example 1

40 g of CF$_2$=CF—O—(CF$_2$)$_5$CN (NVE) and 410 g of a 30% ammonium perfluorooctanoate solution (FX 1006, 3M) containing 1.5% by weight based on the weight of ammonium perfluorooctanoate of a mixture of perfluorinated hydrocarbon compounds having from 5 to 15 carbon atoms available from 3M Company as FZ 348 was heated up to 50° C. under slight agitation. The mixture (pH=4) formed a transparent micro emulsion, stable at room temperature.

Additionally, an aqueous emulsion of NVE in water was prepared by emulsifying 0.28 kg of NVE in water in the presence of 10 g FX 1006 (30% solution) using an Ultra-turrax (IKA-Labortechnik) and a micro fluidizer (Microfluids M-110Y) to achieve an average particle size of about 250 nm.

A 40 L-kettle was charged with 26 L of water, 60 g Na-perfluorobutylsulfinate (NaO$_2$S—C$_4$F$_9$) dissolved in 300 mL water and the micro emulsion prepared. The oxygen free kettle was then charged with 400 g TFE and 1160 g perfluoromethyl vinylether (PMVE). After heating the kettle up to 71° C. (pressure 10 bar) the polymerization was initiated by feeding during 30 min 45 g ammonium persulfate (APS) dissolved in water (10% sol.) into the kettle. Within 6.25 h, 6.1 kg TFE, 5.14 kg PMVE and the aqueous emulsion of NVE prepared as described above were continuously fed into the kettle at a constant pressure of 10 bar. The resulting latex had solid content of 32%, particle size of 70 nm; the coagulated polymer had a composition of 65 mol % TFE, 34.2 mol % PMVE and 0.8 mol % NVE and Mooney viscosity 10+1, 121° C.=58.

Example 2

35 g of CF$_2$=CF—O—(CF$_2$)$_5$CN(NVE), 430 g of 30% ammonium perfluorooctanoate solution (APFO, FX 1006, 3M) containing 1.5% by weight based on the weight of ammonium, perfluorooctanoate of a mixture of perfluorinated hydrocarbon compounds having from 5 to 15 carbon atoms, available from 3M Company as FZ 348, was converted into a micro emulsion as described in example 1. This micro emulsion, 25 L of water and 60 g of Na-perfluorobutylsulfinate in 300 ml water, were charged under oxygen-free conditions with 470 g TFE, 1360 g PMVE. The polymerization was initiated at 73° C., 12 bar by feeding 45 g APS. During 5.0 h 6.0 kg TFE, 5.0 kg PMVE and 0.45 kg NVE pre-emulsified in 1300 g water as described in example 1 were continuously fed. The coagulated polymer showed the following composition: 64.5 mol % TFE, 34.2 mol % PMVE, 1.3 mol NVE; Mooney 10+1, 121° C.=72.

Comparative Examples C1, C2

Example 1 and 2 were repeated with the exception that all of the NVE was added as an aqueous emulsion, i.e. pre-emulsified as described in example 1 rather than as a micro-emulsion.

| C1: Composition | | C2: Composition | |
|---|---|---|---|
| TFE | 66 mol % | TFE | 64.2 mol % |
| PMVE | 33.2 mol % | PMVE | 34.5 mol % |
| NVE | 0.8 mol % | NVE | 1.3 mol % |
| Mooney viscosity | 50 | Mooney viscosity | 78 |

All the nitrile containing polymers were compounded with 20 phr N990 (carbon black), 2 phr Aerosil R972 (colloidal silica) and 1.5 phr Bis(tetrabutylphosphonium-perfluoroadipate-complex) on a two roll mill; (ex. 1 showed the following cure rheology: ML: 0.83 in lb; MH 12.92 in lb; ts$_2$=4.79 min, t$_{50}$: 7.14 min; t'$_{90}$: 13.2 min).

The post cured sheets were the extracted with hot C$_6$F$_6$. in a Soxhlet-apparatus over night (20 hours). In the cooled C$_6$F$_6$ the following amounts of extractables were found:

| Example 1 | 3.1% extractables |
|---|---|
| Example 2 | 3.1% extractables |
| C1 | 8.5% extractables |
| C2 | 6.9% extractables |

The sheets of C1 but also the sheets of C2 (but to a lower amount) showed a shiny; wet looking surface. The fluoroelastomers prepared using the fluoropolymers of example 1 or 2 did not show a shiny, wet looking surface.

Example 3

40 g NVE and 390 g of a 30% by weight solution of highly purified ammonium perfluorooctanoate was gently agitated at room temperature until a clear, transparent microemulsion was obtained. The micro-emulsion was adjusted to pH=4. The polymerization as described in example 1 was repeated using instead of the micro-emulsion described in example 1, the micro-emulsion prepared as described in this example 3. The fluoropolymer so obtained was then compounded and cured as described in the above examples. The resulting cured perfluoropolymer did not show any shiny wet looking surface and had an amount of extractables of 3.3% (measured as described in above examples).

The invention claimed is:

1. Aqueous microemulsion comprising a perfluorinated alkane sulphonic or carboxylic acid or salt thereof, a liquid fluorinated monomer comprising a cure-site and optionally an inert liquid and highly fluorinated hydrocarbon compound wherein the microemulsion is an equilibrium phase.

2. Aqueous microemulsion according to claim 1 wherein the perfluorinated alkane sulphonic or carboxylic acid or salt thereof corresponds to the following formula:

$$(Y-R_f-Z)_n-M \qquad (I)$$

wherein Y represents Cl or F; R$_f$ represents a linear or branched perfluorinated alkylene having 3 to 15 carbon atoms; Z represents COO$^-$ or SO$_3^-$; M represents a cation including monovalent and multivalent cations, and n corresponds to the valence of M.

3. Aqueous microemulsion according to claim 1 wherein said liquid fluorinated monomer is selected from the group of fluorinated vinyl ethers having one or more nitrile groups, fluorinated olefins having one or more nitrile groups, fluorinated olefins having one or more halogen atoms selected from the group consisting of chlorine, bromine and iodine, fluorinated vinyl ethers having one or more halogen atoms selected from the group consisting of chlorine, bromine and iodine and mixtures thereof.

4. Aqueous microemulsion according to claim 1 wherein the liquid fluorinated monomer corresponds to one of the following formulas:

$$CF_2=CF-CF_2-O-R_f-CN$$

$$CF_2=CFO(CF_2)_tCN$$

$$CF_2=CFO[CF_2CF(CF_3)O]_g(CF_2)_vOCF(CF_3)CN$$

$$CF_2=CF[OCF_2CF(CF_3)]_kO(CF_2)_uCN$$

wherein, l represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoroether group.

5. Aqueous microemulsion according to claim 1 wherein the inert liquid and highly fluorinated hydrocarbon compound comprises a perfluorinated hydrocarbon compound.

6. Method of making an aqueous micro-emulsion according to claim 1 comprising mixing together water, a perfluorinated alkane sulphonic or carboxylic acid or salt thereof, a liquid fluorinated monomer having a cure-site and optionally an inert liquid and highly fluorinated hydrocarbon compound.

7. Process of making a fluoropolymer capable of being cured to a fluoroelastomer, the process comprising an aqueous emulsion polymerization of one or more fluorinated monomers and one or more liquid fluorinated monomers having a cure-site, characterized in that at least part of the liquid fluorinated monomers is provided as an aqueous microemulsion as defined in claim 1 during at least the initial stage of the aqueous emulsion polymerization process.

8. Process according to claim 7 wherein at least 2% by weight of the liquid fluorinated monomer having a cure-site based on the total weight of liquid fluorinated monomer having a cure-site is provided during the initial stage of the polymerization.

9. Process according to claim 7 wherein the polymerization is initiated with an initiator system selected from a combination of a fluoroaliphatic sulfinate and an oxidizing agent capable of oxidizing the surfinate to a sulfonyl radical and a combination of a free radical initiator and a water soluble chloride salt.

10. Process according to claim 9 wherein the fluoropolymer is a perfluoropolymer and the initiator system and amount thereof is selected such that the amount of ionic end group in the resulting perfluoropolymer is such that the absorbance ratio determined by calculating the integrated peak intensity within the range of 1840 cm$^{-1}$–1620 cm$^{-1}$ to the integrated peak intensity in the range 2740 cm$^{-1}$–2220 cm$^{-1}$ in a Fourier transform infrared spectrum of the perfluoropolymer, is less than 0.1.

11. Process according to claim 7 further comprising isolating the fluoropolymer from the aqueous dispersion obtained at the end of the polymerization process.

12. Process for making a curable fluoroelastomer composition comprising the steps of providing a fluoropolymer according to the process of claim 11 and mixing the fluoropolymer with a cure composition comprising one or more compounds capable of effecting curing of the fluoropolymer through the cure site components contained in said fluoropolymer.

13. Process according to claim 12 wherein the cure composition further comprises a polyunsaturated coagent.

14. Process for making a fluoroelastomer comprising the steps of providing a curable fluoroelastomer composition according to the process as defined in claim 12 and curing the thus obtained curable fluoroelastomer composition.

15. A composition comprising a fluoropolymer capable of being cured to a fluoroelastomer, wherein the fluoropolymer is derived from an aqueous emulsion polymerization of one or more fluorinated monomers and one or more liquid fluorinated monomers having a cure-site, and wherein at least part of the liquid fluorinated monomers is provided as an aqueous microemulsion according to claim 1 during at least the initial stage of the aqueous emulsion polymerization.

16. The composition of claim 15 wherein the liquid fluorinated monomer is a fluorinated vinyl ether having one or more nitrile groups; a fluorinated olefin having one or more nitrile groups; a fluorinated olefin having one or more halogen atoms selected from chlorine, bromine and iodine; a fluorinated vinyl ether having one or more halogen atoms selected from chlorine, bromine and iodine; or mixtures thereof.

17. The composition of claim 15 wherein the liquid fluorinated monomer corresponds to one of the following formulas:

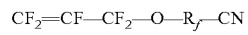

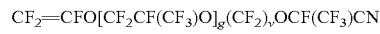

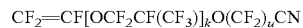

wherein, l represents an integer of 2 to 12; g represents an integer of 0 to 4; k represents 1 or 2; v represents an integer of 0 to 6; u represents an integer of 1 to 6, $R_f$ is a perfluoroalkylene or a bivalent perfluoroether group.

18. The composition of claim 15 wherein the inert liquid and highly fluorinated hydrocarbon compound comprises a perfluorinated hydrocarbon compound.

* * * * *

UNITED STATES PATENT AND TRADEMARK OFFICE
CERTIFICATE OF CORRECTION

PATENT NO.      : 7,094,839 B2
APPLICATION NO. : 10/627149
DATED           : August 22, 2006
INVENTOR(S)     : Werner M. A. Grootaert It is certified that error appears in the above-identified patent and that said Letters Patent is hereby corrected as shown below:

On Title Page

First Page Item 56 Col. 2 (U.S. Patent Document) – Line 9 - After "6,730,760" delete "B1" and insert -- B2 --, therefor.

First Page Item 56 Col. 2 (U.S. Patent Document) – Line 10 - After "6,737,489" delete "B1" and insert -- B2 --, therefor.

Column 1 – Line 24 (Approx.) - Delete "Fluoropolyrners"," and insert -- Fluoropolymers". --, therefor.

Column 4 – Line 29 - Delete "tat" and insert -- that --, therefor.

Column 4 - Line 32 - Delete "151" and insert -- 15 --, therefor.

Column 4 – Line 39 (Approx.) - Delete "$COO^{31}$" and insert -- $COO^-$ --, therefor.

Column 4 – Line 56 - Delete "phenanthene." and insert -- phenanthrene. -- therefor.

Column 4 – Line 63-64 - Delete "perfiucromethyldecalin," and insert -- perfluoromethyldecalin, --, therefor.

Column 5 – Line 2 - Delete "poly(chlorotrifluorocthylene)," and insert -- poly(chlorotrifluoroethylene), --, therefor.

Column 5 – Line 4 - Delete "perfluoro(tripentylamine)," and insert -- perfluoro(triphenylamine), --, therefor.

Column 8 – Line 37 - Delete "ammonium-alkaii-" and insert -- ammonium-aikali- --, therefor.

Column 10 – Line 22 (Approx.) - Delete "detivatives" and insert -- derivatives --, therefor.

Column 14 – Line 3 - Delete "organo-oniurns" and insert -- organo-oniums --, therefor.

Column 14 – Line 4-5 - Delete "phenyltriniethylammoniums," and insert -- phenyltrimethylammoniums, --, therefor.

Column 14 – Line 11 - Delete "[5,4,0]" and insert -- [5.4.0] --, therefor.

UNITED STATES PATENT AND TRADEMARK OFFICE
CERTIFICATE OF CORRECTION

PATENT NO.       : 7,094,839 B2
APPLICATION NO.  : 10/627149
DATED            : August 22, 2006
INVENTOR(S)      : Werner M. A. Grootaert It is certified that error appears in the above-identified patent and that said Letters Patent is hereby corrected as shown below:

Column 14 – Line 53 - Delete "fluoroetastomer" and insert -- fluoroelastomer --, therefor.

Column 14 – Line 63 - Delete "fluorelastomer" and insert -- fluoroelastomer --, therefor.

Column 15 – Line 22 - Delete "decanoyl." and insert -- decanol. --, therefor.

Column 15 – Line 35 (Approx.) - Delete "nitile" and insert -- nitrile --, therefor.

Column 15 – Line 62 - Delete "N,N-dilailyl" and insert-- N,N-diallyl --, therefor.

Column 16 – Line 17 - Delete "fluoropolyrner," and insert -- fluoropolymer, --, therefor.

Column 17 – Line 10 - Delete "micro emulsion," and insert -- micro-emulsion, --, therefor.

Column 17 – Line 19 - Delete "micro emulsion" and insert -- micro-emulsion --, therefor.

Column 17 - Line 41 - Delete "micro emulsion" and insert -- micro-emulsion --, therefor.

Column 17 – Line 42 -Delete "micro emulsion," and insert -- micro-emulsion, --, therefor.

Column 18 – Line 6 - Delete "Soxhiet-apparatus" and insert -- Soxhlet-apparatus --, therefor.

UNITED STATES PATENT AND TRADEMARK OFFICE
CERTIFICATE OF CORRECTION

PATENT NO. : 7,094,839 B2
APPLICATION NO. : 10/627149
DATED : August 22, 2006
INVENTOR(S) : Werner M. A. Grootaert It is certified that error appears in the above-identified patent and that said Letters Patent is hereby corrected as shown below:

Column 19 – Line 30 - In Claim 9, delete "surfinate" and insert -- sulfinate --, therefor.

Signed and Sealed this

Twenty-fourth Day of April, 2007

JON W. DUDAS
*Director of the United States Patent and Trademark Office*